US009303442B2

(12) United States Patent
Proefke et al.

(10) Patent No.: US 9,303,442 B2
(45) Date of Patent: Apr. 5, 2016

(54) PASSIVE VERIFICATION OF OPERATOR PRESENCE IN HANDLING REQUESTS FOR VEHICLE FEATURES

(75) Inventors: David T. Proefke, Troy, MI (US); Charles J. Bongiorno, Sterling Heights, MI (US); Ron Y. Asmar, Southfield, MI (US); Aaron P. Creguer, Otter Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 448 days.

(21) Appl. No.: 13/527,148

(22) Filed: Jun. 19, 2012

(65) Prior Publication Data

US 2012/0330514 A1 Dec. 27, 2012

Related U.S. Application Data

(60) Provisional application No. 61/499,359, filed on Jun. 21, 2011.

(51) Int. Cl.

| | |
|---|---|
| ***E05F 15/00*** | (2015.01) |
| ***E05F 15/76*** | (2015.01) |
| ***E05F 15/77*** | (2015.01) |
| ***G06F 17/00*** | (2006.01) |
| ***E05F 15/73*** | (2015.01) |
| *E05F 15/20* | (2006.01) |
| *G07C 9/00* | (2006.01) |

(52) U.S. Cl.

CPC ............. *E05F 15/77* (2015.01); *E05F 15/2076* (2013.01); *E05F 15/73* (2015.01); *E05F 15/76* (2015.01); *E05F 15/2046* (2013.01); *E05Y 2900/508* (2013.01); *E05Y 2900/542* (2013.01); *E05Y 2900/55* (2013.01); *G07C 2009/00507* (2013.01)

(58) Field of Classification Search

None

See application file for complete search history.

(56) References Cited

U.S. PATENT DOCUMENTS

| | | | | |
|---|---|---|---|---|
| 5,673,017 | A | 9/1997 | Dery et al. | |
| 6,555,978 | B1 * | 4/2003 | Castellon | 318/266 |
| 2004/0043802 | A1 * | 3/2004 | Nagano | 455/575.9 |
| 2004/0256168 | A1 * | 12/2004 | Ueda et al. | 180/273 |
| 2006/0113139 | A1 * | 6/2006 | Nishi et al. | 180/273 |
| 2006/0139179 | A1 * | 6/2006 | Yamada et al. | 340/644 |
| 2006/0142992 | A1 * | 6/2006 | Nishimura et al. | 704/1 |
| 2006/0254847 | A1 * | 11/2006 | Miura et al. | 180/273 |
| 2007/0013545 | A1 | 1/2007 | Tippelt | |
| 2007/0027587 | A1 * | 2/2007 | Pedemas et al. | 701/2 |

(Continued)

FOREIGN PATENT DOCUMENTS

| | | | |
|---|---|---|---|
| CN | 101841560 | A | 9/2010 |
| WO | 03011649 | A1 | 2/2003 |

*Primary Examiner* — Fadey Jabr

*Assistant Examiner* — Kevin P Mahne

(74) *Attorney, Agent, or Firm* — Cantor Colburn LLP

(57) ABSTRACT

Passive verification of operator presence in handling requests for vehicle includes initiating activation of a power-operated vehicle component that is subject to a supervised control mechanism. The activation is initiated in response to a request from an operator-controlled device. The passive verification also includes verifying a presence of the operator-controlled device indicative of a presence of an operator of a vehicle, transmitting intermittent signals to the operator-controlled device, monitoring response signals received in response to the intermittent signals, and continuing activation of the power-operated vehicle component until the activation is complete so long as the response signals are received responsive to the monitoring.

20 Claims, 2 Drawing Sheets

(56) References Cited

U.S. PATENT DOCUMENTS

| | | | | |
|---|---|---|---|---|
| 2007/0142977 | A1* | 6/2007 | Munoz | 701/1 |
| 2007/0152615 | A1* | 7/2007 | Newman et al. | 318/481 |
| 2008/0021618 | A1* | 1/2008 | Nathan et al. | 701/49 |
| 2008/0228365 | A1* | 9/2008 | White et al. | 701/70 |
| 2008/0234878 | A1* | 9/2008 | Joao | 701/2 |
| 2009/0082912 | A1* | 3/2009 | Melman | 701/1 |
| 2009/0082928 | A1* | 3/2009 | Witkowski et al. | 701/49 |
| 2010/0087987 | A1* | 4/2010 | Huang et al. | 701/36 |
| 2010/0222992 | A1* | 9/2010 | Leblanc | 701/113 |
| 2011/0118961 | A1* | 5/2011 | Koenen et al. | 701/113 |
| 2011/0190962 | A1* | 8/2011 | Peterson et al. | 701/2 |
| 2012/0234621 | A1* | 9/2012 | Syvret et al. | 180/281 |

* cited by examiner

PASSIVE VERIFICATION OF OPERATOR PRESENCE IN HANDLING REQUESTS FOR VEHICLE FEATURES

CROSS-REFERENCE TO RELATED APPLICATIONS

This patent application claims priority to U.S. Provisional Patent Application Ser. No. 61/499,359 filed Jun. 21, 2011 which is hereby incorporated herein by reference in its entirety.

FIELD OF THE INVENTION

The subject invention relates to automotive power components and, more particularly, to the passive verification of operator presence in handling requests for vehicle features.

BACKGROUND

Certain power-operated features in a vehicle may result in pinch points during the course of motion (e.g., closing and opening windows, adjusting seat positions, and activating a convertible top). Without costly pinch protection mechanisms, operator requests for the power-operated features are typically required to be continuously present. This requirement is referred to as supervised control. Supervised control may include requiring the operator continuously depress a power control button to maintain motion of the vehicle feature.

In some instances, e.g., when the motion sequence takes six seconds or more, supervised control can be inconvenient for the operator, as the power control button would need to be held down for the duration of this sequence. However, when the operator is not currently occupying the vehicle, and is activating a power-control feature from a key fob, there is no need for the supervised control, which seeks to protect against pinch points.

Accordingly, it is desirable to provide a means to determine presence of an operator during activation of power-operated features in a vehicle through a key fob and use this presence determination to manage the activation process.

SUMMARY OF THE INVENTION

In one exemplary embodiment of the invention, a system for passive verification of operator presence in handling requests for vehicle features is provided. The system includes an electronic control unit including a computer processor and logic executable by the computer processor. The logic is configured to implement a method. The method includes initiating activation of a power-operated vehicle component that is subject to a supervised control mechanism. The activation is initiated in response to a request from an operator-controlled device. The method also includes verifying a presence of the operator-controlled device indicative of a presence of an operator of a vehicle, transmitting intermittent signals to the operator-controlled device, monitoring response signals received in response to the intermittent signals, and continuing activation of the power-operated vehicle component until the activation is complete so long as the response signals are received responsive to the monitoring.

In another exemplary embodiment of the invention, a method for passive verification of operator presence in handling requests for vehicle features is provided. The method includes initiating activation of a power-operated vehicle component that is subject to a supervised control mechanism. The activation is initiated in response to a request from an operator-controlled device. The method also includes verifying a presence of the operator-controlled device indicative of a presence of an operator of a vehicle, transmitting intermittent signals to the operator-controlled device, monitoring response signals received in response to the intermittent signals, and continuing activation of the power-operated vehicle component until the activation is complete so long as the response signals are received responsive to the monitoring.

In a further exemplary embodiment of the invention, a computer program product for passive verification of operator presence in handling requests for vehicle features is provided. The computer program product includes a computer-readable storage medium having instructions embodied thereon, which when executed by the computer causes the computer to implement a method. The method includes initiating activation of a power-operated vehicle component that is subject to a supervised control mechanism. The activation is initiated in response to a request from an operator-controlled device. The method also includes verifying a presence of the operator-controlled device indicative of a presence of an operator of a vehicle, transmitting intermittent signals to the operator-controlled device, monitoring response signals received in response to the intermittent signals, and continuing activation of the power-operated vehicle component until the activation is complete so long as the response signals are received responsive to the monitoring.

The above features and advantages and other features and advantages of the invention are readily apparent from the following detailed description of the invention when taken in connection with the accompanying drawings

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
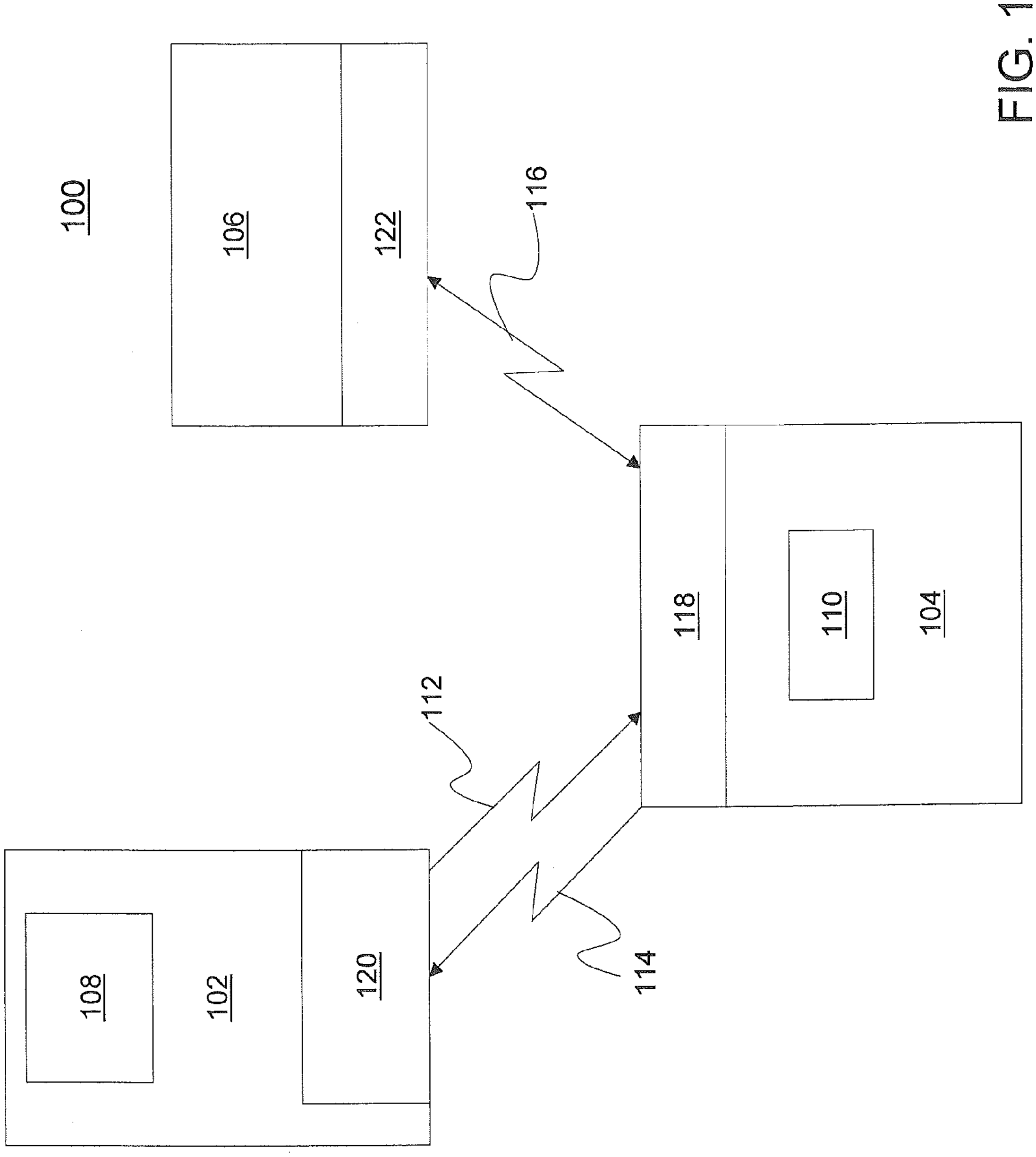
FIG. 1 is a system upon which passive verification of operator presence in handling requests for vehicle features may be implemented in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, passive verification of operator presence in handling requests for vehicle features (referred to herein as power feature management processes) is provided. The power feature management processes provide passive verification of the presence of a vehicle operator, through the presence of an operator-controlled device, such as a vehicle key, (e.g., key fob), smart phone, identification tag, or exterior or interior control, and use this verification to handle operator requests for vehicle features. In an exemplary embodiment, upon an operator request for activation of a power operated vehicle feature (e.g., power convertible top, power seat, power windows), a wireless signal is periodically transmitted to the vehicle key (e.g., key fob) and wireless responses are continuously monitored to verify authorization to continue motion of the power operated vehicle feature.

Turning now to FIG. 1, a system 100 upon which the power feature management processes may be implemented in accordance with an exemplary embodiment will now be described. The system 100 includes a key fob 102 in communication with vehicle components 106 of a vehicle via an electronic control unit (ECU) 104. It will be appreciated that other operator-controlled devices may be used to provide the functionality of the key fob 102, and that the key fob 102 is described herein as a non-limiting example thereof. It will be understood that any exterior control with respect to the vehicle (e.g., key fob, exterior button, smart phone or ID tag) or interior control may be used in implementing the exemplary power feature management processes described herein. The ECU 104 and vehicle components 106 are disposed in the vehicle and are integrated therewith, while the key fob 102 may be physically engaged with (e.g., when inserted in the vehicle ignition) or disengaged from (e.g., held by the vehicle operator) the vehicle.

The key fob 102 is operated by a user of the vehicle (e.g., as an operator or passenger) and includes communication components 120, as well as vehicle controls 108 for activating one or more vehicle components 106. Each of the vehicle controls 108 may be configured to perform one or more functions with respect to the vehicle components 106 when a user selects or activates a corresponding vehicle control 108. For example, one vehicle control 108 may be specified to open and close power windows of the vehicle, and another vehicle control 108 may be specified to retract a convertible top of the vehicle or to restore the convertible top to its original state. In these examples, the vehicle components 106 include the power windows and convertible top, respectively. Each of the vehicle controls 108 may be implemented as a button or sequence of buttons configured on the key fob 102.

In an embodiment, the communication components 120 include a pulse generator that sends low power signals to the vehicle to inform the vehicle of its presence. The pulse generator also sends low power wireless signals 112 to the vehicle's ECU 104 requesting activation of a selected vehicle component 106 when the user selects a vehicle control 108 from the key fob 102. In one embodiment, the low power signals are ultra high frequency (UHF) signals. The communication components 120 also include circuitry to receive signals from the vehicle controls 108 when a user selects or activates (e.g., depresses) them via the key fob 102.

The ECU 104 may include a computer processor and logic 110 for monitoring, controlling, and adjusting various vehicle controls 108 and components 106. For example, the ECU 104 may include an engine control module that communicates with the vehicle components 106 and instructs the components 106 to perform respective operations. The instructions to perform the operations in some instances originate from the key fob 102, as described above. The communications between the vehicle components 106 and the ECU 104 may be implemented through a transceiver 118 at the ECU 104 and a transceiver 122 at each of the vehicle components 106.

In an embodiment, the ECU 104 communicates with the vehicle components 106 over a network 116 of the vehicle. The network 116 may be a wired or wireless communication network. In an embodiment, the network 116 is a local area network (LAN). The network 116 may be a proprietary network configured for the vehicle (e.g., via a vehicle manufacturer).

The ECU 104 sends low power wireless signals 114 to the key fob 102 via the transceiver 118 in response to commands received from the logic 110. Alternatively, the low power wireless signals 114 may be emitted from a low frequency transmitting antenna. In one embodiment, the low power signals 114 are low frequency signals. Alternatively, the signals may be implemented using ultra-high frequency (UHF) transmissions or Bluetooth™.

The vehicle components 106 include settings which may be activated and deactivated in response to commands received from the ECU 104 over the network 116. The functions requested for the vehicle components 106 may include, for example, seat position (driver and/or passenger), window position, and convertible top position. The vehicle components 106 include power-operated devices, such as windows, seats, and convertible top. These power-operated devices are each subject to supervised control (e.g., a pinch protection mechanism) such that implementation of a corresponding function involves the continued execution (e.g., button depress) of a vehicle control 108 to achieve the desired result (e.g., full retraction of the convertible top).

Figure 2:
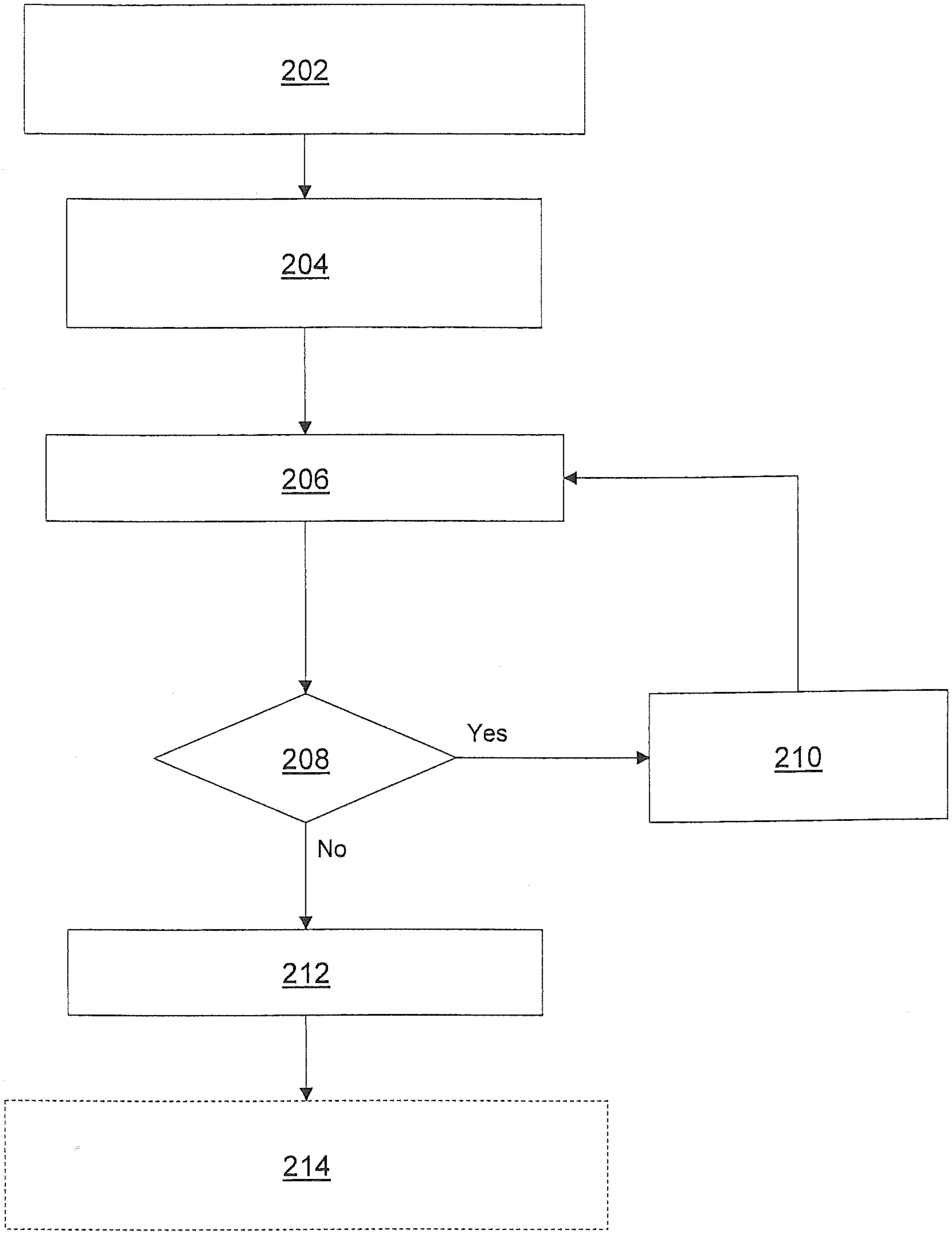
FIG. 2 is a flow diagram describing a process for implementing passive verification of operator presence in handling requests for vehicle features in accordance with an exemplary embodiment.

Turning now to FIG. 2, a process for implementing the power feature management processes will now be described in an exemplary embodiment. The process of FIG. 2 assumes that the exemplary power feature management processes are configured for use with a key fob (e.g., key fob 102) that serves as the operator-controlled device described above. However, as indicated above, the power feature management processes may alternatively be implemented using any suitable interior or exterior controls associated with the vehicle. The process of FIG. 2 further assumes that an operator through the key fob 102 has been authenticated with the vehicle, e.g., through a key code exchange or similar authentication scheme.

At step 202, the ECU 104 receives a request to activate a vehicle component 106. As described above, the ECU 104 receives the request through a signal 112 from the key fob 102 in response to a user selecting a corresponding vehicle control 108.

In response to receiving the request, the logic 110 initiates activation of the vehicle component 106 at step 204. For example, suppose the signal is directed to retracting the convertible top of the vehicle. The logic 110 sends a corresponding command to the transceiver 122 at the convertible top (vehicle component 106) via the ECU transceiver 118 and the network 116.

At step 206, the logic 110 verifies the presence of the key fob 102. In an embodiment, the logic 110 instructs the transceiver 118 to send intermittent signals 114 to the key fob 102. The logic 110 monitors response signals 112 from the key fob 102 in determining the presence. As indicated above, the pulse generator of the communication components 120 sends signals 112 indicating its presence at or near the vehicle. The logic 110 listens for these signals and takes appropriate action based on the presence or absence of these signals. In one embodiment, the logic 110 is configured to discontinue the function of the vehicle component 106 if a response signal 112 is not received from the key fob 102 within a defined threshold period of time (e.g., 250 milliseconds). For example, the logic 110 may be configured to permit the supervised control mechanism to take over, which in turn causes the operation of the vehicle component 106 to discontinue. Likewise, if the response signal 112 is continuously received by the ECU 104, the logic 110 may be configured to override the supervised control mechanism.

At step 208, it is determined in response to the monitoring whether the key fob 102 is present at or near the vehicle. If present, at step 210, in one embodiment the activation of the vehicle component 106 is continued until its function is completed. For example, in the example of the convertible top, the function to retract the top is completed once the convertible top is fully retracted. Alternatively, in another embodiment, the activation of the vehicle component 106 is continued pending further presence detection determinations. For example, the logic 110 continues to send commands to the vehicle component 106 to continue activation of the vehicle component 106 during execution of the corresponding function as long as the transceiver 118 receives response signals 112 from the communication components 120 indicating a continued presence of the key fob 102. This is reflected in the return arrow between steps 210 and 206 with respect to FIG. 2.

Returning to step 208, if the logic 110 determines that the key fob is not present, the logic 110 sends a command to the vehicle component 106 via the network 116 to discontinue its activation function at step 212. As indicated above in step 210, the logic 110 may be configured to monitor response signals 112 through the execution of the function to determine a continued presence of the key fob 102. In this embodiment, the logic 110 may be configured to send activation commands to the vehicle component 106 throughout the execution of the function so long as it receives response signals 112 from the key fob 102. For example, the logic 110 may be configured to discontinue sending activation signals over network 116 if it does not receive a response signal 112 from the key fob 102 within a defined threshold period of time.

In an optional step, the logic 110 may be configured to send another command to the vehicle component 106 to revert back to its original state at step 214 (e.g., to return a partially retracted convertible top to its closed or covered position).

Technical effects of the invention include performing passive verification of operator presence in handling requests for vehicle features. The power feature management processes provide passive verification of the presence of a vehicle operator, through the presence of a vehicle key or similar device (e.g., key fob, smart phone), and use this verification to handle operator requests for vehicle features. Upon an operator request for activation of a power operated vehicle feature (e.g., power convertible top, power seat, power windows), a wireless signal is periodically transmitted to the vehicle key (e.g., key fob) and wireless responses are continuously monitored to verify authorization to continue motion of the power operated vehicle feature. If a response signal is not received within a pre-defined period of time, the motion or execution of the vehicle feature is discontinued.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the application.

The invention claimed is:

1. A system, comprising:

a vehicle electronic control unit including a computer processor; and logic for passive verification a presence of an operator of a vehicle, the logic stored executable by the computer processor, the logic configured to cause the system to perform:

initiating an operation of a power-operated vehicle component in response to a request from an operator-controlled device and subsequent to authentication of the operator-controlled device with the vehicle, wherein the operation of the power-operated vehicle component is subject to a supervised control mechanism that requires continuous operator input to the operator-controlled device;

verifying a presence of the operator-controlled device indicative of the presence of the operator of the vehicle;

overriding the supervised control mechanism in response to verifying the operator-controlled device is present;

operating the power-operated vehicle component absent the continuous operator input to the operator-controlled device based on the overriding of the supervised control mechanism;

transmitting a plurality of intermittent signals to the operator-controlled device during the operation of the power-operated vehicle component;

monitoring response signals received in response to the intermittent signals; and continuing the operation of the power-operated vehicle component until the activation is complete so long as the response signals are received responsive to the monitoring.

2. The system of claim 1, wherein the logic is further configured to cause the system to perform:

discontinuing the operation of the power-operated vehicle component when no response signals are received for a defined duration of time, the discontinuing including returning control of the power-operated vehicle component to the supervisory control mechanism.

3. The system of claim 1, wherein the power-operated vehicle component includes power seats.

4. The system of claim 1, wherein the power-operated vehicle component includes a convertible top.

5. The system of claim 1, wherein the operator-controlled device includes at least one of:

a key fob; and an interior control on the vehicle.

6. The system of claim 1, wherein the intermittent signals are transmitted via low power wireless signals.

7. The system of claim 1 wherein the operator-controlled device includes an identification tag.

8. The system of claim 1, wherein the operator-controlled device comprises an exterior control on the vehicle.

9. The system of claim 1, wherein the operator-controlled device comprises an interior control on the vehicle.

10. The system of claim 1, wherein the logic is further configured to cause the system to perform:

reverting the power-operated vehicle component to an original state when the response signals are not received.

11. The system of claim 1, wherein the logic is further configured to cause the system to perform:

discontinuing the operation of the power-operated vehicle component when the response signals are not received after a defined threshold period of time by removing the override of the supervisory control mechanism.

12. The system of claim 11, wherein the defined threshold period of time is 250 milliseconds.

13. The system of claim 1, wherein the supervised control mechanism is a pinch protection mechanism.

14. The system of claim 1, wherein the continuous operator input comprises a continued depression of a button of the vehicle.

15. A method for passive verification a presence of an operator of a vehicle, comprising:

initiating, by a vehicle electronic control unit of the vehicle, the vehicle electronic control unit including a computer processor, an operation of a power-operated vehicle component in response to a request from an operator-controlled device and subsequent to authentication of the operator-controlled device with the vehicle, wherein the operation of the power-operated vehicle component is subject to a supervised control mechanism that requires continuous operator input to the operator-controlled device;

verifying, from a wireless signal received by a transceiver of the vehicle, a presence of the operator-controlled device indicative of the presence of the operator of the vehicle;

overriding the supervised control mechanism in response to verifying the operator-controlled device is present;

operating the power-operated vehicle component absent the continuous operator input to the operator-controlled device based on the overriding of the supervised control mechanism;

transmitting a plurality of intermittent signals to the operator-controlled device during the operation of the power-operated vehicle component;

monitoring response signals received in response to the intermittent signals; and continuing the operation of the power-operated vehicle component, by the vehicle electronic control unit, until the activation is complete so long as the response signals are received responsive to the monitoring.

16. The method of claim 15, wherein the power-operated vehicle component includes power seats.

17. The method of claim 15, wherein the power-operated vehicle component includes a convertible top.

18. The method of claim 15, wherein the operator-controlled device includes at least one of:

a key fob;

a smart phone;

an identification tag;

an exterior control on the vehicle; and an interior control on the vehicle.

19. The method of claim 15, wherein the intermittent signals are transmitted via low power wireless signals.

20. A computer program product comprising a computer-readable storage medium having instructions for passive verification a presence of an operator of a vehicle embodied thereon, the instructions being executable by a computer processor of a vehicle electronic control unit to cause the vehicle electronic control unit to perform:

initiating an operation of a power-operated vehicle component in response to a request from an operator-controlled device and subsequent to authentication of the operator-controlled device with the vehicle, wherein the operation of the power-operated vehicle component is subject to a supervised control mechanism that requires continuous operator input to the operator-controlled device;

verifying a presence of the operator-controlled device indicative of the presence of the operator of the vehicle;

overriding the supervised control mechanism in response to verifying the operator-controlled device is present;

operating the power-operated vehicle component absent the continuous operator input to the operator-controlled device based on the overriding of the supervised control mechanism;

transmitting a plurality of intermittent signals to the operator-controlled device during operation of the power-operated vehicle component;

monitoring response signals received in response to the intermittent signals; and continuing the operation of the power-operated vehicle component until the activation is complete so long as the response signals are received responsive to the monitoring.

* * * * *